United States Patent Office 3,099,669
Patented July 30, 1963

3,099,669
FERROCENE COMPOUNDS
Thomas Leigh, Macclesfield, England, assignor to Imperial Chemical Industries Limited, London, England, a corporation of Great Britain
No Drawing. Filed Jan. 21, 1960, Ser. No. 3,719
Claims priority, application Great Britain Feb. 9, 1959
2 Claims. (Cl. 260—439)

This invention relates to organic compounds and more particularly it relates to ferrocene derivatives which are useful as haematinics for the treatment of iron deficiency anaemia in man and animals.

According to the invention we provide compounds of the formula:

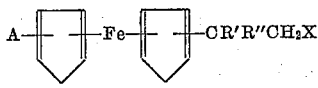

wherein A stands for hydrogen or for the group

CR'R''CH$_2$X wherein R' and R'' both stand for hydrogen or together stand for an oxygen atom, and X stands for a secondary or tertiary alkyl radical or for a cycloalkyl or a phenyl radical which may optionally be substituted.

The secondary or tertiary alkyl radical (X) preferably contains not more than 10 carbon atoms and more particularly between 3 and 7 carbon atoms. The cycloalkyl radical may be a cyclohexyl radical and the phenyl radical may optionally be substituted by one or more lower alkyl radicals for example by methyl radicals.

As compounds of the above-stated formula there may be mentioned for example 1:1'-di-tert-butylacetylferrocene, 1:1'-bis(3:3-dimethylbutyl)-ferrocene, phenylacetylferrocene, β - phenylethylferrocene, 1:1' - di - isovalerylferrocene, 1:1' - di - isoamylferrocene, 1:1'-di-(3:5:5 - trimethylhexanoyl)ferrocene, 1:1' - di - (3:5:5-trimethyl)hexylferrocene, cyclohexylacetylferrocene, β-cyclohexylethylferrocene, (3:4 - dimethylphenyl)acetyl-ferrocene and β-(3:4-dimethylphenyl)ethylferrocene and of these, a preferred compound is β-phenylethylferrocene.

According to a further feature of the invention we provide a process for the manufacture of those compounds of the above stated formula wherein R' and R'' stand for hydrogen which comprises reducing acyl derivatives of the formula:

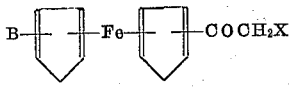

wherein B stands for hydrogen or for the group COCH$_2$X wherein X has the meaning stated above.

It is to be understood that the said reduction process promotes the reduction of the keto group or groups in the molecule in preference to the saturation of the double bonds. The process may be carried out by any means known to the art for example by use of the Clemmenson reduction process or catalytically in the presence of hydrogen and a hydrogenation catalyst. The process may thus be carried out by use of a suitable reducing agent for example amalgamated zinc in the presence of ethanolic hydrochloric acid. Other reducing agents which may be used are for example hydrogen in the presence of a catalyst for example copper chromite or platinum oxide optionally in the presence of a solvent or diluent for example acetic acid.

According to a further feature of the invention we provide a process for the manufacture of those compounds of the above stated formula wherein R' and R'' stand for hydrogen which comprises interaction of the corresponding alkylcyclopentadienyl alkali metal derivatives and an anhydrous iron halide.

The alkali metal derivatives may be for example the alkylcyclopentadienyl-sodium, -potassium or -lithium derivatives. The reaction is preferably carried out at a temperature in the range of 0° C. to 25° C. and in the presence of an inert diluent or solvent for example tetrahydrofuran or toluene. The preferred iron halides are the chlorides or bromides and either the ferrous salt or the ferric salt may be used as the latter is reduced to the ferrous state by the alkylcyclopentadienyl alkali metal derivative used as reactant.

The alkylcyclopentadienyl alkali metal derivatives used as starting materials may conveniently be prepared from the corresponding alkylcyclopentadiene derivative by reaction with the alkali metal in a finely-divided state in the presence of an inert diluent or solvent for example tetrahydrofuran or by reaction with the alkali metal in the presence of liquid ammonia as diluent and ferric nitrate as a catalyst. The alkylcyclopentadiene derivatives themselves may be obtained by alkylation of an alkali metal derivative of cyclopentadiene for example the sodium derivative with the corresponding alkyl halide for example the corresponding alkyl chloride. The reaction is preferably carried out in an inert diluent or solvent for example tetrahydrofuran.

According to a further feature of the invention we provide a process for the manufacture of those compounds of the above stated formula wherein R' and R'' together stand for an oxygen atom which comprises reacting ferrocene either with an appropriate acid halide or with the corresponding acid anhydride.

The said acid halide or acid anhydride is preferably dissolved in an inert diluent or solvent for example nitrobenzene, carbon disulphide, nitromethane or ethylene dichloride, and ferrocene is added thereto followed by an acidic catalyst under controlled temperature conditions. The reaction temperature is preferably within the range of −20° C. to 100° C. and suitable acidic catalysts may be those catalysts used in the conventional Friedel-Crafts synthesis for example aluminum chloride, boron fluoride, zinc chloride and hydrofluoric acid. In order to obtain mono- rather than di-acyl derivatives the acid halide or acid anhydride is preferably reacted with ferrocene in the presence of anhydrous hydrofluoric acid or syrupy phosphoric acid. Suitable acid halides and acid anhydrides may be for example tert.-butylacetyl chloride, phenylacetyl chloride, isovaleryl chloride, 3:5:5-trimethylhexanoyl chloride, cyclohexylacetyl chloride, (3:4-dimethylphenyl)acetyl chloride, phenylacetic anhydride and isovalenic anhydride.

As stated above, the ferrocene compounds with which this invention is concerned are useful as haematinics for the treatment of iron deficiency anaemia in man and animals and this forms yet a further feature of the invention. The said compounds may thus be used as the active ingredient in pharmaceutical and veterinary compositions intended for oral or parenteral administration, in compositions for external application or in compositions for addition to animal foodstuffs. The compositions for oral use may be for example tablets, optionally coated, pills, capsules, pastes, aqueous suspensions or emulsions, oily solutions or suspensions, any of which may be coloured and/or sweetened and/or flavoured in order to provide a palatable preparation. Compositions for parenteral use may be sterile injectable aqueous suspensions, oily solutions or emulsions or the corresponding sterile powders which can be made up into a sterile injectable liquid preparation. Compositions for external application may be for example suppositories for use in body cavities. Preparations for animal administration in foodstuffs may be in the form of a solid or liquid premix suitable for addition to animal foodstuffs which may be liquid for example milk products used for the feeding of young animals.

The invention is illustrated but not limited by the following examples in which the parts are by weight:

Example 1

11.8 parts of tert.-butylacetylchloride are added to a solution of 7.4 parts of ferrocene in 100 parts of ethylene dichloride. The mixture is stirred, cooled to 0° C. and 16.0 parts of anhydrous aluminium chloride are added during one hour. The mixture is stirred at 20° C. during a further 2 hours and is then poured onto ice. The organic solvent layer is separated and is washed with dilute aqueous sodium hydroxide, then with water, and dried. The solvent is removed at 50° C. under reduced pressure. The residue is crystallised from petroleum ether (80–100° C.) and there is thus obtained 1:1'-di-tert.-butylacetylferrocene, M.P. 94° C.

Example 2

16.0 parts of granulated zinc are added to a solution of 1.6 parts of mercuric chloride in 20 parts of N-aqueous hydrochloric acid. After ten minutes the aqueous solution is decanted and the zinc amalgam is added to a mixture of 40 parts of ethyl alcohol, 60 parts of concentrated hydrochloric acid and 6.0 parts of 1:1'-di-tert.-butylacetylferrocene (obtained as described in Example 1). The mixture is stirred and heated under reflux during six hours. The precipitated oil is decanted whilst hot from excess zinc and is then cooled and allowed to crystallise.

This solid so obtained is washed with water and crystallised from ethyl alcohol. There is thus obtained 1:1'-di-(3:3-dimethylbutyl)ferrocene, M.P. 62° C.

Example 3

To a stirred suspension of 38 parts of finely divided sodium in 500 parts of tetrahydrofuran at 20–30° C. are added 250 parts of (3:3-dimethylbutyl)cyclopentadiene during 2 hours. After stirring during a further 24 hours the mixture is cooled to 5° C. and 110 parts of anhydrous ferrous chloride are added during 1 hour. The mixture is stirred at 20–25° C. during 4 hours and it is then poured onto ice. The mixture is filtered, the residual solid is washed with water and is then crystallised from ethyl alcohol. There is thus obtained 1:1'-di-(3:3-dimethylbutyl)ferrocene, M.P. 62° C.

The (3:3-dimethylbutyl)cyclopentadiene used as the starting material in the foregoing example may be prepared in the following manner: 281 parts of cyclopentadiene are added to a stirred suspension of 100 parts of finely-divided sodium and 1500 parts of tetrahydrofuran at 20–30° C. during 1 hour. The mixture is stirred at 20–30° C. during a further 1 hour and then 525 parts of 3:3-(dimethylbutyl)chloride are added and the mixture is heated under reflux during 2 hours. The mixture is then cooled to 25° C. and poured onto ice. The upper organic layer is washed with water and dried. The solvent is removed at 50° C. under reduced pressure and the residue is distilled. There is thus obtained (3:3-dimethylbutyl)cyclopentadiene, B.P. 38° C./2.0 mm.

Example 4

47 parts of phenylacetylchloride are added with stirring to 150 parts of anhydrous hydrofluoric acid at 0° C. during 15 minutes. The stirring is continued at this temperature and 31 parts of ferrocene are added during 15 minutes. The temperature is raised to 120° C. and after 4 hours the reaction mixture is carefully poured onto crushed ice. The mixture is filtered and the solid residue is washed with water until free from acid. It is then crystallised from ethyl alcohol and there is thus obtained phenylacetylferrocene, M.P. 130° C.

Example 5

The reduction process as described in Example 2 is repeated except that the 6.0 parts of 1:1'-di-tert.-butylacetylferrocene used as starting material are replaced by 6.0 parts of phenylacetylferrocene (obtained as described in Example 4). There is thus obtained in a similar manner β-phenylethylferrocene, M.P. 60° C.

Example 6

The process described in Example 1 is repeated except that the 11.8 parts of tert.-butylacetyl chloride are replaced by 10.7 parts of isovaleryl chloride. There is thus obtained in a similar manner 1:1'-di-isovalerylferrocene, M.P. 61° C.

Example 7

16 parts of granulated zinc are used to prepare zinc amalgam as described in Example 2 and the amalgam is added to a mixture of 15 parts of concentrated hydrochloric acid, 7.5 parts of water and 5.6 parts of 1:1'-di-isovaleryl ferrocene. The mixture is stirred and heated under reflux during six hours. It is then cooled and the yellow oil is separated and washed with water. The oil is distilled under reduced pressure and there is obtained 1:1'-di-isoamyl ferrocene, B.P. 128° C./0.3 mm.

Example 8

The process described in Example 1 is repeated except that the 11.8 parts of tert.-butylacetyl chloride are replaced by 17.6 parts of 3:5:5-trimethylhexanoyl chloride. There is thus obtained in a similar manner 1:1'-di-(3:5:5-trimethylhexanoyl)ferrocene, M.P. 55° C.

Example 9

The reduction process described in Example 2 is repeated except that the 6.0 parts of 1:1'-di-tert.-butylactylferrocene are replaced by 7.0 parts of 1:1'-di-(3:5:5-trimethylhexanoyl)ferrocene. There is thus obtained in a similar manner 1:1'-di-(3:5:5-trimethylhexyl)ferrocene as an orange coloured oil at 25° C.

Example 10

The process described in Example 4 is repeated except that the 47 parts of phenylacetyl chloride are replaced by 49 parts of cyclohexylacetyl chloride. There is thus obtained in a similar manner cyclohexylacetylferrocene, M.P. 84° C.

Example 11

The process described in Example 2 is repeated except that 6.0 parts of 1:1'-di-tert.-butylacetylferrocene are replaced by 6.0 parts of cyclohexylacetylferrocene. There is thus obtained in a similar manner β-cyclohexylethylferrocene, M.P. 30° C.

Example 12

The process described in Example 4 is repeated except that the 47 parts of phenylacetyl chloride are replaced by 45 parts of (3:4-dimethylphenyl) acetyl chloride. There is thus obtained in a similar manner (3:4-dimethylphenyl)acetylferrocene, M.P. 77° C.

The 3:4-dimethylphenylacetyl chloride used in the foregoing example may be prepared in the following manner. A mixture of 77 parts of 3:4-dimethylacetophenone, 24 parts of sulphur and 66 parts of morpholine is heated under reflux for fifteen hours. The mixture is cooled and 30 parts of ethyl alcohol are added. The mixture is then filtered and the residue of crude 3:4-dimethylphenylacetothiomorpholide is washed with ethyl alcohol. The crude solid is added to a mixture of 70 parts of acetic acid, 40 parts of concentrated sulphuric acid and 30 parts of water and this mixture is stirred and heated under reflux during eight hours. The mixture is poured into water and the precipitated solid is removed by filtration and washed with water. The solid is stirred with 1000 parts of dilute aqueous sodium hydroxide and the mixture is filtered. Dilute sulphuric acid is added to the filtrate, the mixture is filtered and the solid residue is washed with water and dried. There is obtained 3:4-dimethylphenylacetic acid, M.P. 95° C.

A mixture of 32 parts of 3:4-dimethylphenylacetic acid, 40 parts of thionyl chloride and 50 parts of carbon tetrachloride is heated under reflux during two hours. The solution is distilled and there is obtained 3:4-dimethylphenylacetyl chloride, B.P. 136° C./12 mm.

*Example 13*

The process described in Example 2 is repeated except that the 6.0 parts of 1:1'-di-tert.-butylacetylferrocene are replaced by 6.0 parts of (3:4-dimethylphenylacetyl)ferrocene. There is thus obtained in a similar manner β-(3:4-dimethylphenyl-ethylferrocene, M.P. 77° C.

What I claim is:
1. Cyclohexylacetylferrocene.
2. β-Cyclohexylethylferrocene.

References Cited in the file of this patent

UNITED STATES PATENTS

| | | |
|---|---|---|
| 2,680,756 | Pauson | June 8, 1954 |
| 2,709,175 | Graham | May 24, 1955 |
| 2,820,740 | London et al. | Jan. 21, 1958 |
| 2,851,394 | Vaughan | Sept. 9, 1958 |

FOREIGN PATENTS

| | | |
|---|---|---|
| 763,550 | Great Britain | Dec. 12, 1956 |
| 786,626 | Great Britain | Nov. 20, 1957 |

OTHER REFERENCES

Rosenblum: Thesis on Ferrocene, Harvard University (1953), pages 17–22, 35–38, 84–87.

Sutin, et al.: Journal of Inorganic Nuclear Chemistry, vol. 6, pages 91–98 (1958).